(12) United States Patent
Kumar et al.

(10) Patent No.: US 12,093,277 B2
(45) Date of Patent: Sep. 17, 2024

(54) DATA MODELING AND DATABASE RECOMMENDATION USING MACHINE LEARNING

(71) Applicant: Dell Products L.P., Round Rock, TX (US)

(72) Inventors: Dhilip S. Kumar, Bangalore (IN); Jaganathan Subramanian, Bangalore (IN); Raja Sekhar Eega, Krishna District (IN); Astha Malhotra, Noida (IN); Solleti Praveen Kumar, Hyderabad (IN); Ashraf Afzal Syed, Hyderabad (IN); Himesh Chopra, Chandigarh (IN); Smriti Mishra, Bangalore (IN); Sumanta Pandit, Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/110,209

(22) Filed: Feb. 15, 2023

(65) Prior Publication Data

US 2024/0273112 A1    Aug. 15, 2024

(51) Int. Cl.
*G06F 16/20* (2019.01)
*G06F 16/21* (2019.01)
*G06F 16/25* (2019.01)

(52) U.S. Cl.
CPC .......... *G06F 16/258* (2019.01); *G06F 16/212* (2019.01)

(58) Field of Classification Search
CPC ............................ G06F 16/258; G06F 16/212
See application file for complete search history.

(56) References Cited

U.S. PATENT DOCUMENTS

| | | | |
|---|---|---|---|
| 2018/0018579 A1* | 1/2018 | Xu | G06N 20/20 |
| 2018/0150528 A1* | 5/2018 | Shah | G06F 16/254 |
| 2019/0108223 A1* | 4/2019 | Fabijancic | G06F 8/30 |
| 2020/0012662 A1* | 1/2020 | Walters | G06T 7/248 |
| 2020/0104375 A1* | 4/2020 | Earnesty, Jr. | G06F 16/214 |
| 2021/0241131 A1* | 8/2021 | Khawas | G06N 3/08 |
| 2021/0342857 A1* | 11/2021 | Tzur | G06N 5/01 |
| 2023/0004538 A1 | 1/2023 | Kumar et al. | |

OTHER PUBLICATIONS

A. Panwar, "Types of Database Management Systems," https://www.c-sharpcorner.com/UploadFile/65fc13/types-of-database-management-systems/, Jun. 9, 2021, 9 pages.

(Continued)

*Primary Examiner* — Kristopher Andersen
(74) *Attorney, Agent, or Firm* — Ryan, Mason & Lewis, LLP

(57) ABSTRACT

A method comprises reading data of one or more files and identifying one or more data types corresponding to the one or more files. In the method, at least one destination database for the data is recommended based at least in part on the one or more data types. A data model to use in connection with writing the data to the at least one destination database is generated. The generation of the data model is based at least in part on the one or more data types corresponding to the one or more files. At least the generation of the data model is performed using one or more machine learning algorithms.

20 Claims, 19 Drawing Sheets

(56) References Cited

OTHER PUBLICATIONS

Learn Computer Science, "Database Keys," https://www.learncomputerscienceonline.com/database-keys/, Accessed Jun. 15, 2021, 41 pages.
C. Sherman, "Designing a Cassandra Data Model," shermandigital.com, Apr. 26, 2017, 16 pages.
Wikipedia, "Extract, Transform, Load," https://en.wikipedia.org/w/index.php?title=Extract,_transform,_load&oldid=1021911882, May 7, 2021, 9 pages.
A. Amir, "Pattern Matching Algorithms," CS 663, Lecture #2, Sep. 1, 2010, 9 pages.
P. Kononow, "Metadata in Relational Databases (RDBMS)" https://dataedo.com/kb/databases/all/metadata, Sep. 30, 2018, 3 pages.
Stitch Data, "OLTP and OLAP: A Practical Comparison," https://www.stitchdata.com/resources/oltp-vs-olap/#:~:text=OLTP and OLAP%3A, Accessed May 20, 2021, 6 pages.
J. Franklin, "Parquet, ORC, and Avro: The File Format Fundamentals of Big Data," https://www.upsolver.com/blog/the-file-format-fundamentals-of-big-data#:~:text=Optimized, Oct. 26, 2022, 19 pages.
Dataverse Project, "CSV/TSV," https://guides.dataverse.org/en/latest/user/tabulardataingest/csv-tsv.html, Nov. 4, 2022, 3 pages.
Wikipedia, "Comma-separated Values," https://en.wikipedia.org/wiki/Comma-separated_values, Jan. 17, 2023, 10 pages.
Wikipedia, "Tab-separated Values," https://en.wikipedia.org/wiki/Tab-separated_values, Feb. 26, 2022, 3 pages.

\* cited by examiner

```
import pandas as pd
import numpy as np
import math
employee = pd.read_csv('employee.csv')
def calc_entropy(column):
    #Calculate entropy given a pandas series, list, or numpy array

# Compute the counts of each unique value in the column
    counts = np.bincount(column)
    # Divide by the total column length to get a probability
    probabilities = counts / len(column)

# Initialize the entropy to 0
    entropy = 0
    # Loop through the probabilities, and add each one to the total entropy
    for prob in probabilities:
        if prob > 0:
            # use log from math and set base to 2
            entropy += prob * math.log(prob, 2)

return -entropy
```

FIG. 7

```
columns = ['age?', 'region?', 'gender?']
def highest_info_gain(columns):
    #Intialize an empty dictionary for information gains
    information_gains = {}
    #Iterate through each column name in our list
    for col in columns:
        #Find the information gain for the column
        information_gain = calc_information_gain(midwest, col, 'midwest?')
        #Add the information gain to our dictionary using the column name as the ekey
        information_gains[col] = information_gain
    #Return the key with the highest value
    return max(information_gains, key=information_gains.get)
```

FIG. 9

```
1   # Start Writing Here
2
3   def get_data_from_db(connection,qry):
4       notification_data=connection.execute(qry)   #fetch latest notificati
5       return notification_data
6
7
8   def parse_notification(data):
9       #parse and get the file path and template/table name from notificat
10      reutrn data.s3_file_path,data.table_name
11
12
13  def get_file_from_s3(s3_file_path):
14      return downloaded_file_object
15
16  def load_to_db(connection,file_object):
17      return True if file inserted else false
```

FIG. 12

DATA MODELING AND DATABASE RECOMMENDATION USING MACHINE LEARNING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to a framework for management of data for loading into destination databases.

BACKGROUND

Enterprises often create data as a strategic asset. As a result, the scale and types of data continue to increase. Different databases support different data models and data types, which creates difficulties when moving different types of data to different databases that employ different data formats and distinct storage and access conventions.

Database designs may vary based on the specific customer problems which the databases are designed to address. For example, some databases may provide better scale-out functionality by parallelizing query processing across processors and nodes, while others provide scalability at the cost of per-node performance.

Current approaches for integrating and/or moving data to differently configured databases rely on pre-modeled data validation, integration and transformation tools, which are largely inefficient and prone to errors.

SUMMARY

Illustrative embodiments provide techniques to use machine learning to manage data of different types for loading into differently configured databases.

For example, in one embodiment, a method comprises reading data of one or more files and identifying one or more data types corresponding to the one or more files. In the method, at least one destination database for the data is recommended based at least in part on the one or more data types. A data model to use in connection with writing the data to the at least one destination database is generated. The generation of the data model is based at least in part on the one or more data types corresponding to the one or more files. At least the generation of the data model is performed using one or more machine learning algorithms.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 7 illustrates example pseudocode for using an entropy technique to select root node attributes in an illustrative embodiment.

FIG. 9 illustrates example pseudocode for computing information gain in an illustrative embodiment.

FIG. 12 illustrates example pseudocode for dynamic data loading in an illustrative embodiment.

DETAILED DESCRIPTION

Figure 1:
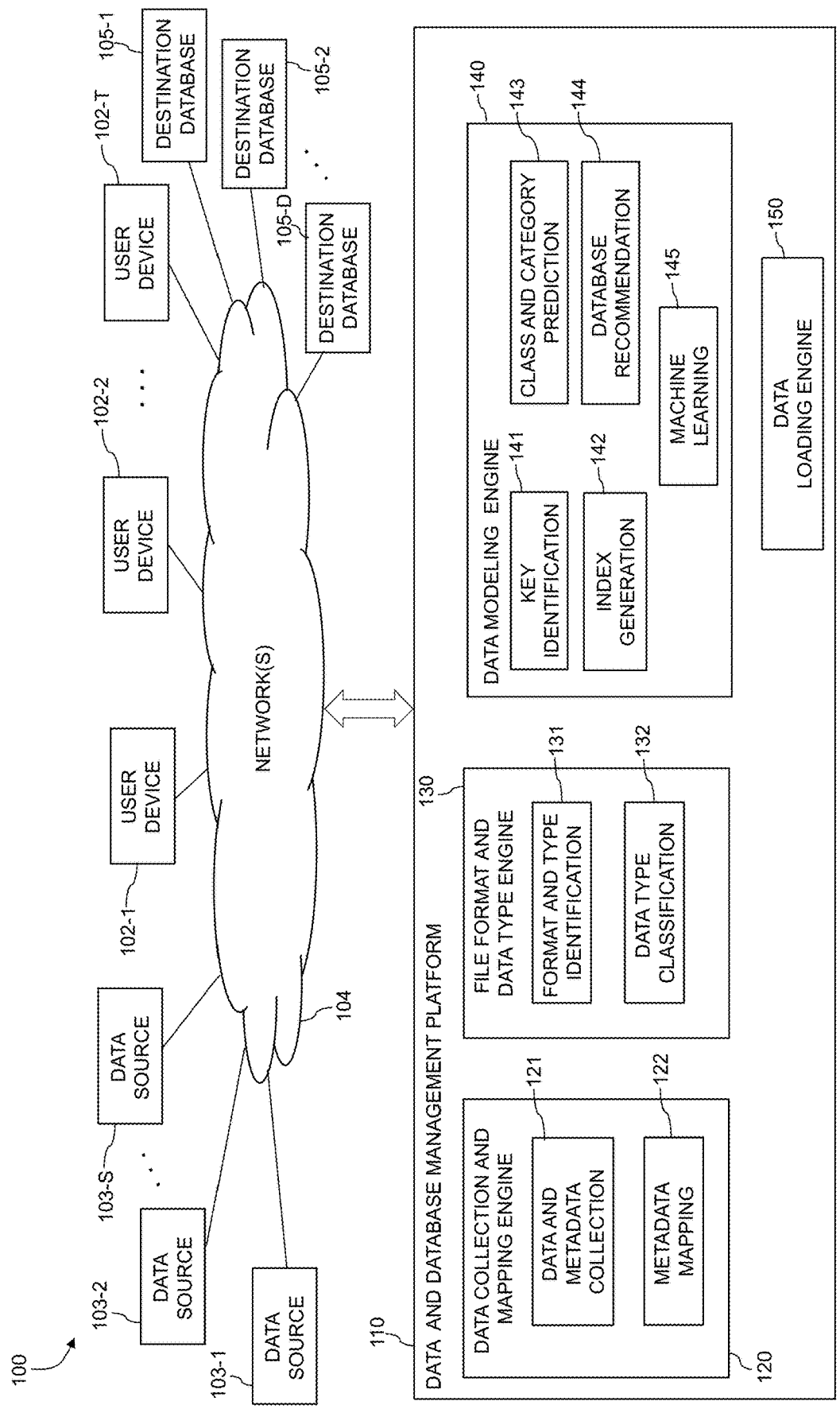
FIG. 1 depicts an information processing system with a data and database management platform for managing data for loading into destination databases in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, "application programming interface (API)" or "interface" refers to a set of subroutine definitions, protocols, and/or tools for building software. Generally, an API defines communication between software components. APIs permit programmers to write software applications consistent with an operating environment or website.

FIG. 1 shows an information processing system 100 configured in accordance with an illustrative embodiment. The information processing system 100 comprises user devices 102-1, 102-2, . . . 102-T (collectively "user devices 102"). The user devices 102 communicate over a network 104 with a data and database management platform 110.

The user devices 102 can comprise, for example, Internet of Things (IOT) devices, desktop, laptop or tablet computers, mobile telephones, or other types of processing devices capable of communicating with the data and database management platform 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable T and other similar index variables herein such as D, K, L, M, N, P, S, X, Y and Z are assumed to be arbitrary positive integers greater than or equal to two.

The terms "client" or "user" herein are intended to be broadly construed so as to encompass numerous arrangements of human, hardware, software or firmware entities, as well as combinations of such entities. Data and database management services may be provided for users utilizing one or more machine learning models, although it is to be appreciated that other types of infrastructure arrangements could be used. At least a portion of the available services and functionalities provided by the data and database management platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the data and database management platform 110, as well as to support communication between the data and database management platform 110 and connected devices (e.g., user devices 102) and/or other related systems and devices not explicitly shown.

In some embodiments, the user devices 102 are assumed to be associated with repair technicians, system administrators, information technology (IT) managers, software developers, release management personnel or other authorized personnel configured to access and utilize the data and database management platform 110.

The information processing system 100 further includes data sources 103-1, 103-2, . . . 103-S (collectively "data sources 103") and destination databases 105-1, 105-2, . . . 105-D (collectively "destination databases 105") connected to the user devices 102 and to the data and database management platform 110 via the network 104. Like the user devices 102, the data sources 103 may comprise, for example, IoT devices, desktop, laptop or tablet computers, mobile telephones, or other types of processing devices capable of communicating with the data and database management platform 110 over the network 104. The data sources 103 produce, maintain and/or store files in various formats. The various formats include, but are not necessarily limited to, comma-separated value (CSV) format, tab-separated value (TSV) format, Parquet format, optimized row columnar (ORC) format, document (DOC) format or other type of file format.

According to one or more embodiments, a CSV file comprises a delimited text file that uses a comma to separate values. For example, respective lines of a file comprise a data record including one or more fields separated by commas. A CSV file can store tabular data (e.g., numbers and text). A TSV file is a text format to store data in a tabular structure (e.g., database table, spreadsheet). Respective records in the table comprise one line of the text file. Each field value of a record is separated from the next by a tab character, such that TSV format is a variation of CSV format.

ORC is an open-source columnar storage file format that stores collections of rows in a columnar format within a file. As explained in more detail in connection with FIG. 3 (see ORC file 361-4), ORC files comprise independent stripes of data. Stripes may comprise, for example, index data, record data, and stripe footer data. A stripe footer can include statistics for each column within a stripe such as, for example, count, min, max, sum, etc. In some embodiments, a stripe footer includes metadata about the ORC file, file footer data and post-scripts.

Parquet (Apache® Parquet) is an open-source column-oriented file format. As explained in more detail in connection with FIG. 3 (see Parquet file 361-2), Parquet files comprise row groups, with each row group including data from the same ones of a plurality of columns. Each column in a row group is divided into a plurality of pages. Parquet files further comprise headers and footers.

The data sources 103 may alternately or additionally comprise one or more databases. For example, the data sources 103 and destination databases may comprise any combination of one or more databases such as, but not necessarily limited to, hierarchical, network, online transactional processing (OLTP), online analytical processing (OLAP), document, columnar, massive parallel processing (MPP), hierarchical, network, object-oriented, NoSQL (no structured query language), graph and/or relational databases.

In some non-limiting examples, in a hierarchical database, data is stored in parent-child relationships in a tree-like structure. Network databases use a network structure to create a relationship between entities. In relational databases, data is stored in a tabular form including columns and rows. An example of a relational data and database management system (RDBMS) is PostgreSQL. Columns in a table represent attributes and rows represent records. Fields in the table correspond to data values. SQL can be used to query relational databases, and to perform tasks such as, for example inserting, updating, deleting, and searching records. Object-oriented databases store objects, which comprise, for example, data and instructions or software programs (referred to as methods) outlining tasks to be performed on or in connection with the data. MPP databases provide scale-out by parallelizing query processing across processors and nodes using a shared-nothing architecture.

NoSQL databases are databases that do not use SQL as a data access language. Graph, network, object and document databases are examples of NoSQL databases. Document databases are an example of NoSQL databases that store data in the form of documents. Each document comprises the data, the data's relationship with other data elements, and data attributes. In one or more embodiments, document databases store data in key-value form. Document databases comprise intuitive data models and flexible schema. Document databases allow for full-text searches and analytics of logs and metrics.

Figure 3:
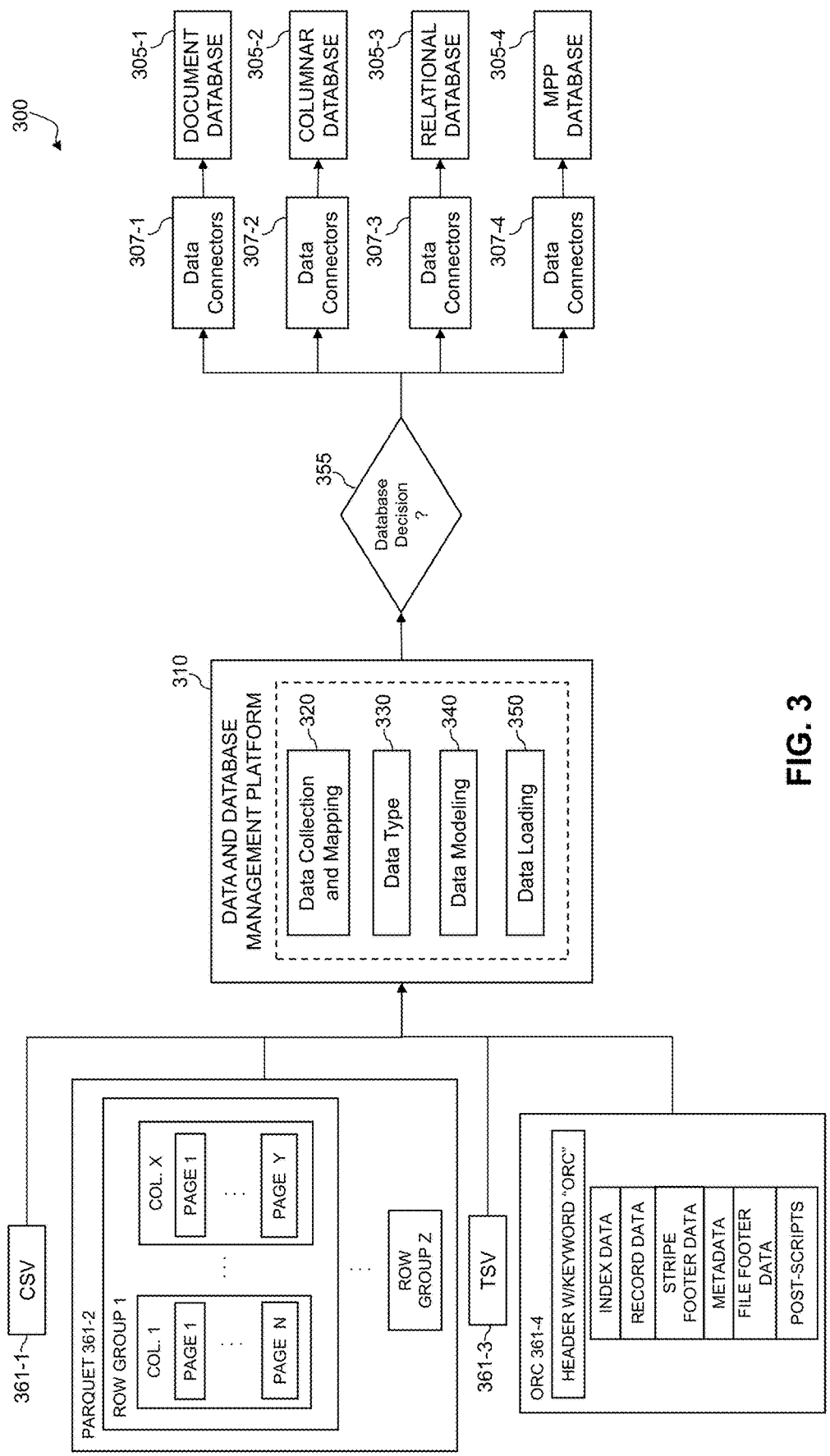
FIG. 3 depicts an operational flow for preparation and loading of data to destination databases in an illustrative embodiment.

For example, referring to the operational flow 300 in FIG. 3, destination databases 105 comprise, for example, a document database 305-1, a columnar database 305-2, a relational database 305-3 and an MPP database 305-4. As can be understood the data sources 103 and destination databases 105 may include any combination of databases. Different user devices 102 and/or data sources 103 may have different in-memory databases (e.g., memory resident databases) that primarily rely on a main memory of the user device 102 or devices of the data sources 103 for data storage.

The data and database management platform 110 in the present embodiment is assumed to be accessible to the user devices 102, the data sources 103 and the destination databases 105 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The data and database management platform 110, on behalf of respective infrastructure tenants each corresponding to one or more users associated with respective ones of the user devices 102 provides a platform for managing data for loading into destination databases. The data and database management platform 110 provides the ability to load the data into multiple types of databases by performing file data validation, transformion and loading. The embodiments advantageously provide techniques for transferring data by using machine learning and the methodical generation of, for example, schemas, tables, documents and indices. The embodiments further provide techniques for loading of data into destination databases in designated file formats.

The data and database management platform 110 seamlessly integrates various types of files and formats, recommends database types, creates data models, and identifies data replication keys (e.g., primary key, distribution key, partition key, surrogate keys, etc.). Unlike conventional approaches, the embodiments provide a systematic pipeline to load data automatically to different types of databases.

Referring to FIG. 1, the data and database management platform 110 includes a data collection and mapping engine 120, a file format and data type engine 130, a data modeling engine 140 and a data loading engine 150. The data collection and mapping engine 120 comprises a data and metadata collection layer 121 and a metadata mapping layer 122. The file format and data type engine 130 comprises a format and type identification layer 131 and a data type classification layer 132. The data modeling engine 140 includes a key identification layer 141, an index generation layer 142, a class and category prediction layer 143, a database recommendation layer 144 and a machine learning layer 145. The operational flow 300 in FIG. 3 depicts a data and database management platform 310, which is the same as or similar to the data and database management platform 110. Like the data and database management platform 110, the data and database management platform 310 includes a data collection and mapping engine 320, a file format and data type engine 330, a data modeling engine 340 and a data loading engine 350, which are the same as or similar to the data collection and mapping engine 120, the file format and data type engine 130, the data modeling engine 140 and the data loading engine 150, respectively.

Figure 2:
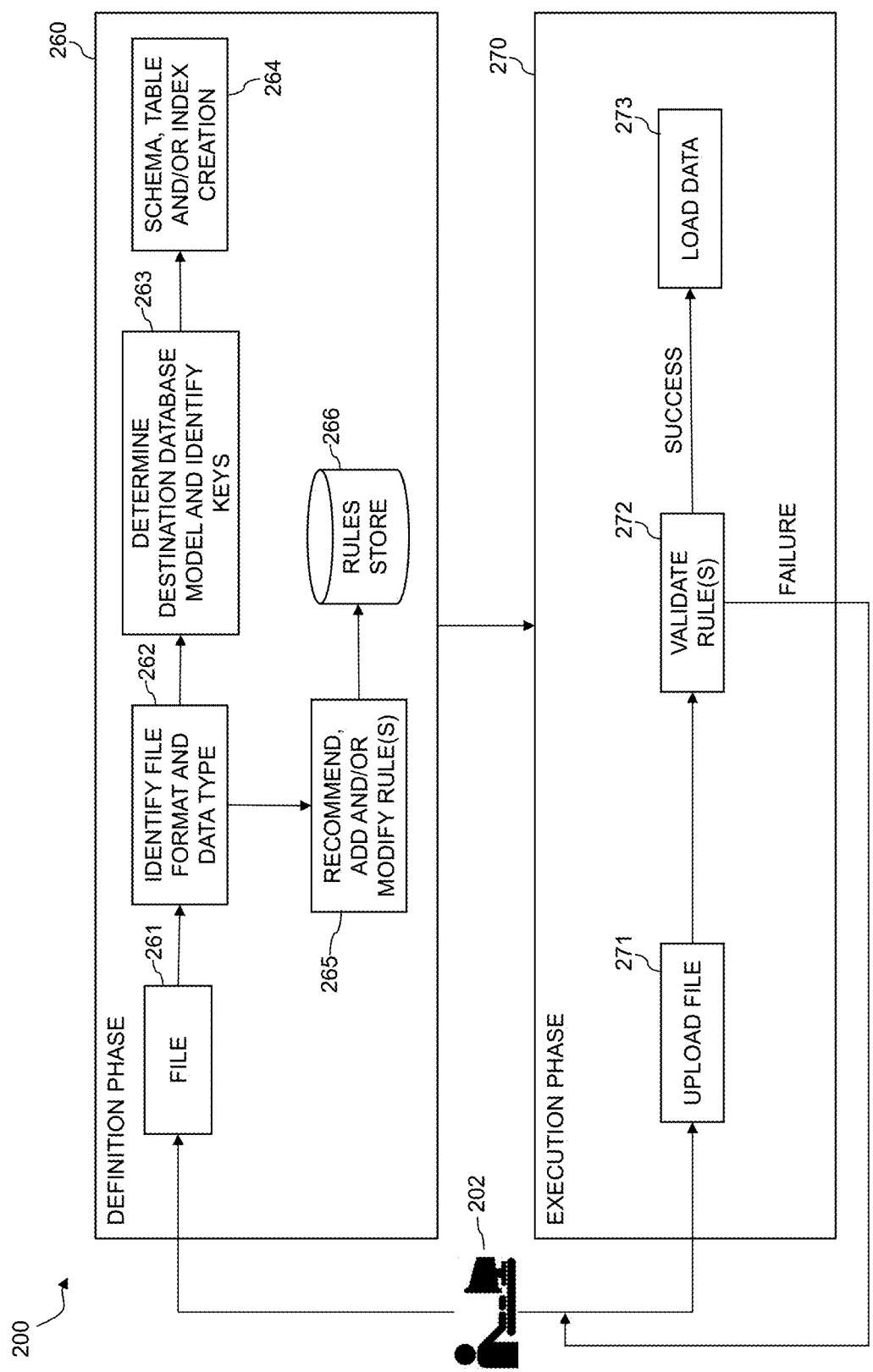
FIG. 2 depicts an operational flow for data validation and loading in an illustrative embodiment.

Referring to FIG. 1 and to the operational flows 200 and 300 in FIGS. 2 and 3, the data collection and mapping engine 120/320 collects data from data sources 103. The collection of data includes reading data from differently formatted files, such as, for example, a CSV file 361-1, a Parquet file 361-2, a TSV file 361-3 and an ORC file 361-4. The data is collected by the data and metadata collection layer 121 in the native file formats.

In addition, the data and metadata collection layer 121 collects metadata defining the data from the data sources 103, including metadata about files of the data sources 103 (e.g., files 361) and the formats of the files. As explained further herein, the data and metadata collection layer 121 also collects metadata defining the data from the destination databases 105 (or 305-1 through 305-4). Metadata from the data sources 103 and destination databases 105/305 comprises, for example, information corresponding to file formats and data and database schema including, but not necessarily limited to, tables, columns, column statistics, constraints, attributes, data types, keys, indexes and/or sequences. For example, the metadata may include details about data records and fields of CSV and TSV files, row groups, columns, headers and footers of Parquet files and headers, footers and stripes of ORC files. The metadata may also include data corresponding to programs and/or applications associated with the files and/or databases including, but not necessarily limited to, views, functions, procedures and/or triggers, data corresponding to file and/or database security including, but not necessarily limited to, authorized users, authorized groups, access information and/or privileges, data corresponding to file and/or database implementation including, but not necessarily limited to, partitions, files and/or backups, and data corresponding to file and/or database storage structure including, but not necessarily limited to, sizes of tables and indexes and/or the number of rows and columns in tables.

Figure 4:
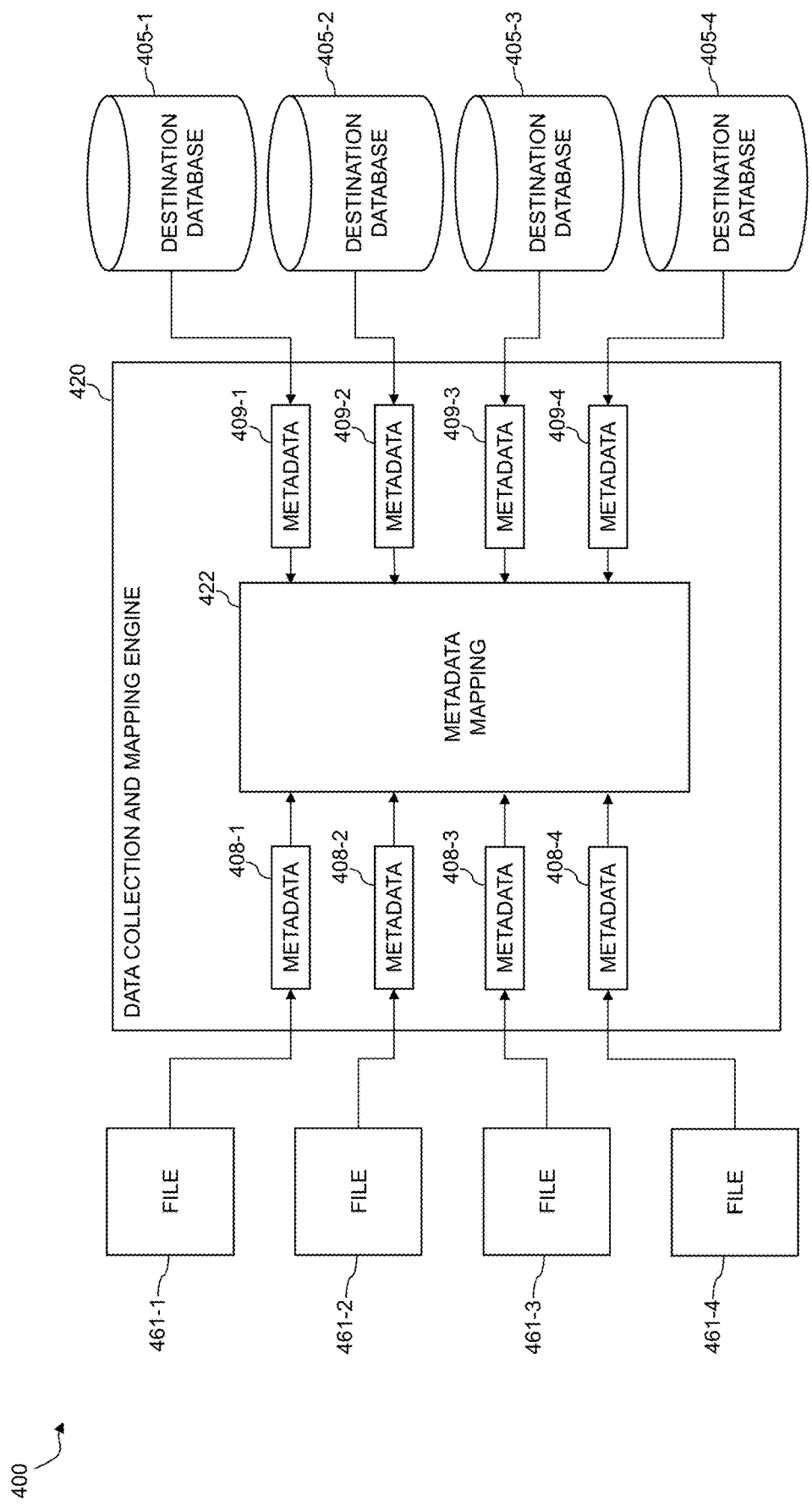
FIG. 4 depicts an operational flow for mapping metadata between source files and destination databases in an illustrative embodiment.

A metadata mapping layer 122 maps the collected metadata from the data sources 103 to the collected metadata from the destination databases 105. Referring, for example, to the operational flow 400 in FIG. 4, a metadata mapping layer 422 (which is the same as or similar to the metadata mapping layer 122) of a data collection and mapping engine 420 (which is the same as or similar to the data collection and mapping engine 120) maps the metadata 408-1, 408-2, 408-3 and 408-4 (collectively "source metadata 408") corresponding to files 461-1, 461-2, 461-3 and 461-4 (collectively "files 461") of data sources 103 to the metadata 409-1, 409-2, 409-3 and 409-4 (collectively "destination metadata 409") from destination databases 405-1, 405-2, 405-3 and 405-4 (collectively "destination databases 405").

The metadata mapping layer 422 (or 122) receives the collected source and destination metadata 408 and 409 from the files 461 and destination databases 405, and maps the source metadata 408 to the destination metadata 409 in order to map available file formats and data types of the files 461 to the available file formats and data types of the destination databases 405. For example, referring back to FIG. 1, the format and type identification layer 131 of the file format and data type engine 130 identifies available file formats and data types corresponding to the data sources 103 and destination databases 105, which are mapped to each other by the metadata mapping layer 122. As used herein, "data type" or "data types" is to be broadly construed to refer to, for example, categories or kinds of stored data having a distinct type or range of values. Some non-limiting examples of data types include, but are not necessarily limited to, integers (e.g., whole numbers), characters (e.g., a, c, $, #, 5, G, %, etc.), character strings (e.g., ordered sequences of characters such as, for example, bcd, abc123, 4gyv#$@!), floating point numbers (e.g., real numbers in decimal form), Boolean values (e.g., True, False), variable character (varchar), dates and timestamps. Depending on data type, the data may be presented in various configurations. For example, date and time data may be presented as "dd/mm/yyyy, 12:00 PM").

As used herein, "file format" or "file formats" is to be broadly construed to refer to, for example, how the data is stored. As noted herein above, some non-limiting examples of file formats include, for example, CSV format, TSV format, Parquet format, ORC format, DOC format or other type of file format.

In general, when a database is created, file formats are specified and data types are set for each field of the database. For example, if a database includes book titles, then characters and/or character strings are needed for the title field, while integers may be needed for a field related to the number of pages. Data types facilitate classification of data values with common properties.

The source and destination file formats and data types are mapped based on file format names (e.g., CSV, TSV, Parquet, ORC, DOC) and data type names (e.g., integer, character, character string, floating point number, Boolean value, varchar, date and/or timestamp) identified from the source and destination metadata 408 and 409. The file formats and data types of the data sources (e.g., files 461) and of the destination databases 405 are mapped by the metadata mapping layer 422. When data is flowing from one or more of the files 461 and destination databases 405, defined file formats and data types of the files 461 and destination databases 405 are identified. For example, in FIG. 1, defined file formats and data types of the data sources 103 and destination databases 105 are identified by the format and type identification layer 131.

Referring, for example, to the operational flow 200 in FIG. 2, in a definition phase 260, at block 262, file format and data type of data in a file 261 are identified. At block 265, based on the identified file format and/or data type, rules defining or outlining parameters for defining file formats and/or data types of incoming files are automatically generated, recommended and/or modified. In some cases, a user may generate, recommend and/or modify rules based on the identified file format and/or data type. The rules are stored in a rules store 266.

Document databases may not have defined data types. For the document databases, a pattern matching algorithm is used to identify the data types. More specifically, a data type classification layer 132 applies one or more pattern matching algorithms to identify data types for databases which do not include defined data types. Examples of pattern matching algorithms include a dictionary matching algorithm and a Baker-Bird algorithm.

In the dictionary matching algorithm, a set of pattern strings D={P1, P2, . . . , Pn} referred to as a dictionary is pre-processed. Subsequently, for every input, text string T=T1, T2 . . . Tz, where n and z are integers. The output comprises all locations in the text where there is a match with any pattern in the dictionary. A naive solution to the dictionary matching problem searches for each pattern in the text independently. Then, the text is scanned n times.

The Baker-Bird algorithm is a first linear-time algorithm for two-dimensional pattern matching with bounded alphabets obtained independently. In a first phase of the Bird-Baker algorithm, a pattern is pre-processed, where each row of pattern P is given a unique name using an Aho-Corasick (AC) automaton for the pattern rows. P is represented as a one-dimensional (1D) vector and the 1D vector is constructed using a Knuth Morris Pratt (KMP) automaton. In a second phase of the Bird-Baker algorithm, row matching with label positions of text string T is performed using the AC automaton, where suffixes match rows of pattern P. In a third phase of the Bird-Baker algorithm, column matching on named columns of text string T to find pattern occurrences is performed using the KMP automaton. Two or more of the phases can be executed simultaneously. The Baker-Bird algorithm extends to dictionary matching. For example, if the KMP automaton is replaced with an AC automaton, the above Baker-Bird algorithm solves a two-dimensional (2D) dictionary matching problem. The embodiments are not necessarily limited to the use of the dictionary matching and/or Baker-Bird algorithms, and other pattern-matching algorithms may be used to identify data types for databases which do not include defined data types.

Referring back to FIGS. 1, 2 and 3, the data modeling engine 140/340 recommends at least one destination database 105 for data of a given data source 103 (e.g., files 261/361) based at least in part on one or more file formats and/or data types identified by the file format and data type engine 130/330. The data modeling engine 140/340 generates a data model to use in connection with writing the data to the at least one destination database. The generation of the data model is based at least in part on the one or more file formats and/or data types identified by the file format and data type engine 130/330. At least the generation of the data model is performed using one or more machine learning algorithms.

The data modeling engine 140 of the data and database management platform 110 generates a data model to use in connection with writing the data to the at least one destination database based at least in part on the file formats and/or data types corresponding to the destination database, and the mapping of the data source file formats and/or data types to the destination database file formats and/or data types.

In more detail, in generating the data model to use in connection with writing the data to the at least one destination database, the key identification layer 141, in conjunction with the machine learning layer 145, predicts one or more destination database keys. The one or more destination database keys comprise, for example, a primary key, a distribution key, a partition key and a surrogate key.

For example, a destination database may require key columns that can be used as a data distribution key, primary key, partition key and indexes. The right key strengthens the data model. In a non-limiting example, in relational databases, the data model is normalized, removing as much duplication as possible. NoSQL type of database denormalization of data may be repeated among many tables. The entities' relationships can be essential because the order in which data is stored in a database can significantly affect the ease and speed of data retrieval. Some modern databases replicate partition data based on a replication factor, using more disk space. Replication is a necessary aspect of distributed databases, where sizing of disk storage can be essential.

As used herein, a "database key" or "key" is to be broadly construed to refer to, for example, an attribute or a group of attributes that can uniquely identify a database record, such as, for example, a record in a table of relational database. In a non-limiting example, rows in a database table may include records or tuples, and columns may represent attributes. For example, in a database of employees, employee ID, last name, first name, region, age and gender are examples of attributes. Referring to the table 501 in FIG. 5A, in an example of a database key for relational data, a primary key relates to a unique single attribute such as, for example, employee ID that has a unique value for each row in a table. Another example of a primary key may be a social security number (SSN). Referring to the table 502 in FIG. 5B, in another example of a database key, a distribution key comprises a column or group of columns that is used to determine the database partition in which a particular row of data is stored. In the table 502, the distribution key comprises employee ID, last name and region, which would comprise a group of columns of a database table of employees. A distribution key is used in, for example, a distribution database to determine how data is stored in and retrieved from multiple nodes.

Figures 5A, 5B:
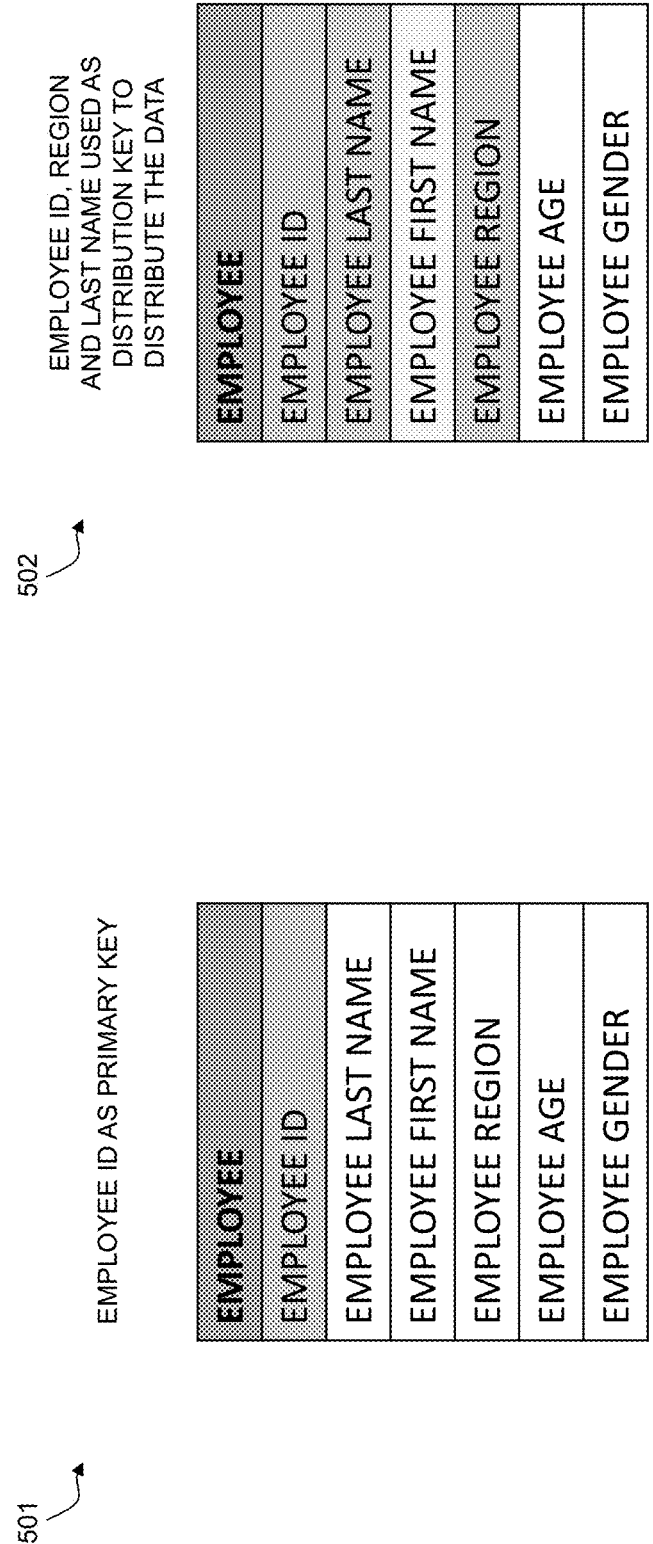
FIG. 5A depicts an example of a primary key for relational data in an illustrative embodiment.
FIG. 5B depicts an example of a distribution key in a column-oriented database in an illustrative embodiment.

When the data and database management platform 110 replicates the relational database data into a column-oriented (columnar) database (e.g., NoSQL relational database to column-oriented distribution database), the data's key will change to, for example, the distribution key shown in FIG. 5B. Since the data moves from a row orientation database to a columnar orientation database and vice versa, the data needs to be classified. Classification is discussed further herein in connection with the class and category prediction layer 143 of the data modeling engine 140.

In another example of a database key, a surrogate key is added to a table as a prime attribute for the purpose of defining a primary key. For example, a surrogate key may comprise automatically generated integer values in increasing sequential order (e.g., 1, 2, 3, 4, 5) as a column in a table.

In another example of a database key, a partition key is used to distribute data among nodes. For example, the partition key may be used in a relational database to split the data for storage and retrieval. A columnar database may organize data into partitions, where each partition comprises multiple columns, and partitions are stored on a node. Nodes are generally part of a cluster where each node is responsible for a fraction of the partitions. When inserting records, the columnar database will hash the value of the inserted data's partition key, and use this hash value to determine which node is responsible for storing the data. A partition key may be the same as the primary key when the partition key comprises a single column. In one or more embodiments, in generating the data model to use in connection with writing the data to the at least one destination database, the key identification layer 141, in conjunction with the machine learning layer 145 predicts one or more partitions for the destination database.

In some cases, the data moving from a source database to a destination database 105 must be classified, such as, for example, when the data moves from a row orientation database to a columnar orientation database and vice versa. The embodiments employ a structured data classification technique where the data is categorized into a given number of classes. A goal of classification is to identify the category and/or class under which the data in the destination database 105 will fall. A classification model utilized by the class and category prediction layer 143 in conjunction with the machine learning layer 145 draws conclusions from input values given from training data. According to an embodiment, classifiers of the class and category prediction layer 143 use a fit(X, y) method to fit the model for given training data X and train label y. A target is predicted given an unlabeled observation X, where predict(X) returns a predicted label y.

In one or more embodiments, the combination of a decision tree and random forest algorithm classifies the data and identifies the database keys (e.g., distribution key, primary key, partition key) and indexes based on destination database type. In addition, the index generation layer 142 generates one or more indexes in accordance with the structure of the destination database. The decision tree algorithm constructs decision trees in which attributes are split. The decision trees end with leaf nodes (e.g., final class labels), and certain attributes are identified in order to classify database nodes.

For example, in generating the destination database model, the class and category prediction layer 143 in conjunction with the machine learning layer 145 uses a decision tree algorithm to identify one or more attributes to select as nodes of the destination database. The class and category prediction layer 143 computes entropy for respective ones of the one or more attributes following a split of the respective ones of the one or more attributes, and computes information gain for respective ones of the one or more attributes. The one or more attributes with the highest information gain are selected as the nodes of the destination database.

Figure 6B:
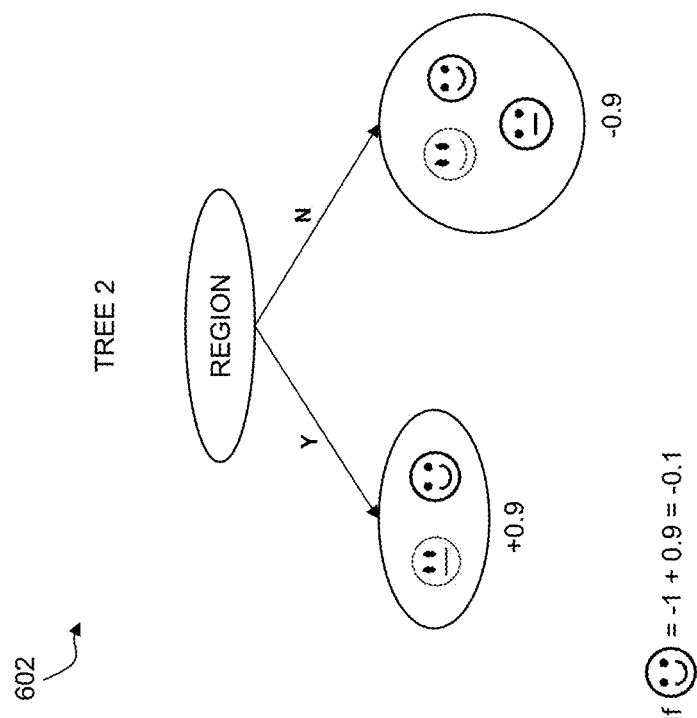
FIG. 6B depicts a decision tree based on region in an illustrative embodiment.
Figure 6A:
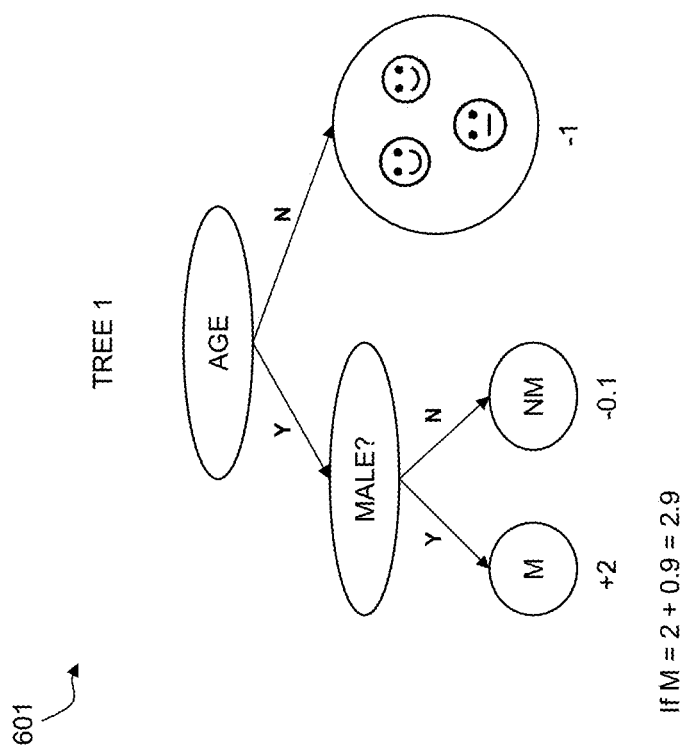
FIG. 6A depicts a decision tree based on age in an illustrative embodiment.

Attribute selection is performed to identify the root node's attribute in each level of a decision tree. For example, referring to the decision trees 601 and 602 in FIGS. 6A and 6B, if age is the attribute that is split as in the decision tree 601, more node splits are required to classify the data than if region is the attribute that is split as in the decision tree 602. Entropy is applied at each node or attribute to find purity. FIG. 7 illustrates example pseudocode 700 for using an entropy technique to select root node attributes in an illustrative embodiment. Referring to the "If" statements in FIGS. 6A and 6B, entropy values are applied according to the following equation (1):

$$\text{Entropy} = -(p(0)*\log(P(0)) + p(1)*\log(P(1))) \quad (1)$$

Figure 8A:
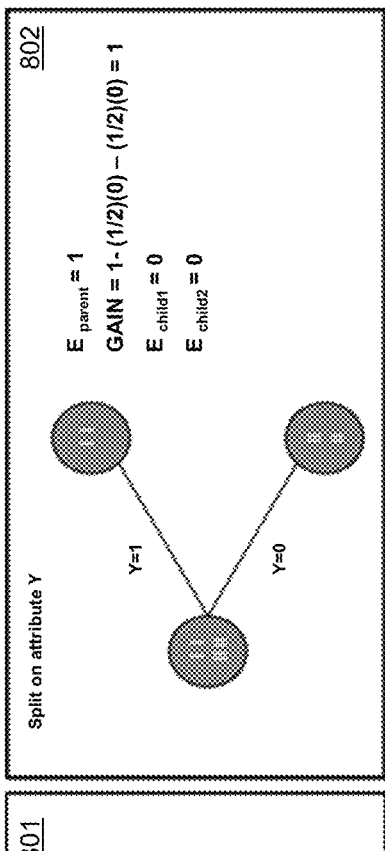
FIGS. 8A, 8B and 8C illustrate different attribute splits and resulting information gain in an illustrative embodiment.
Figure 8B:
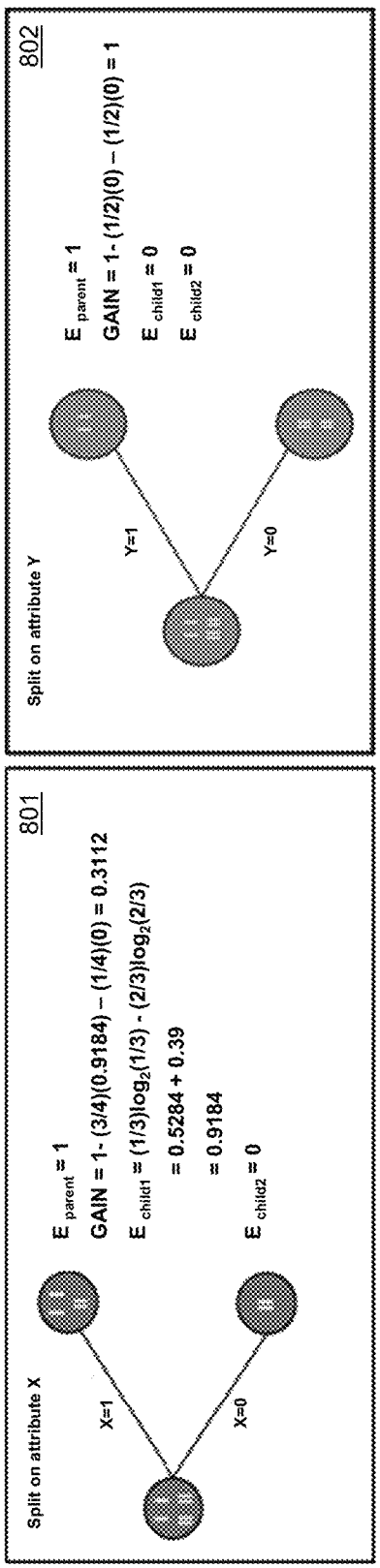
Figure 8C:
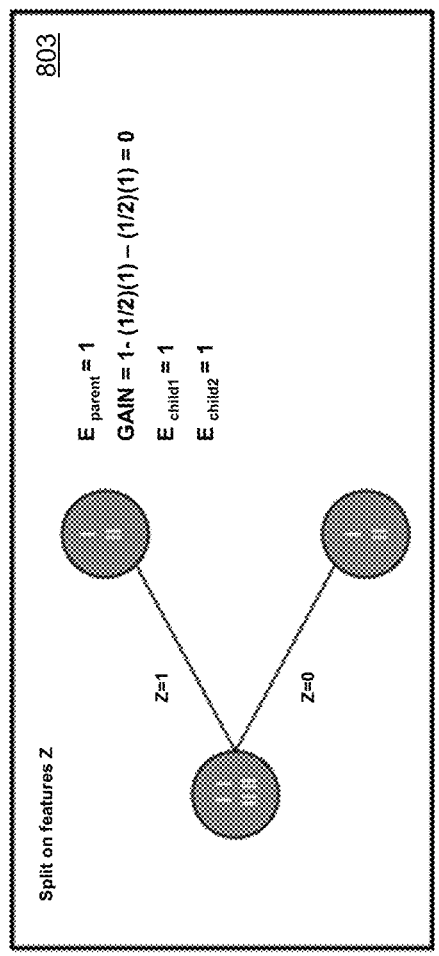

Referring to the different attribute splits 801, 802 and 803 of FIGS. 8A, 8B and 8C, the information gain for each attribute is calculated. In a decision tree information gain algorithm, decision trees are built based on different attribute splits. For example, in connection with the three attributes X, Y, Z, the information gain is highest when a split is performed on feature Y. The information gain for attributes X, Y and Z is 0.3112, 1 and 0, respectively. So, for the root node, the best-suited feature is feature Y. In addition, while splitting the dataset by feature Y, the child contains a pure subset of the target variable, and the dataset does not need to be broken down further. FIG. 9 illustrates example pseudocode 900 for computing information gain in an illustrative embodiment.

Figure 10:
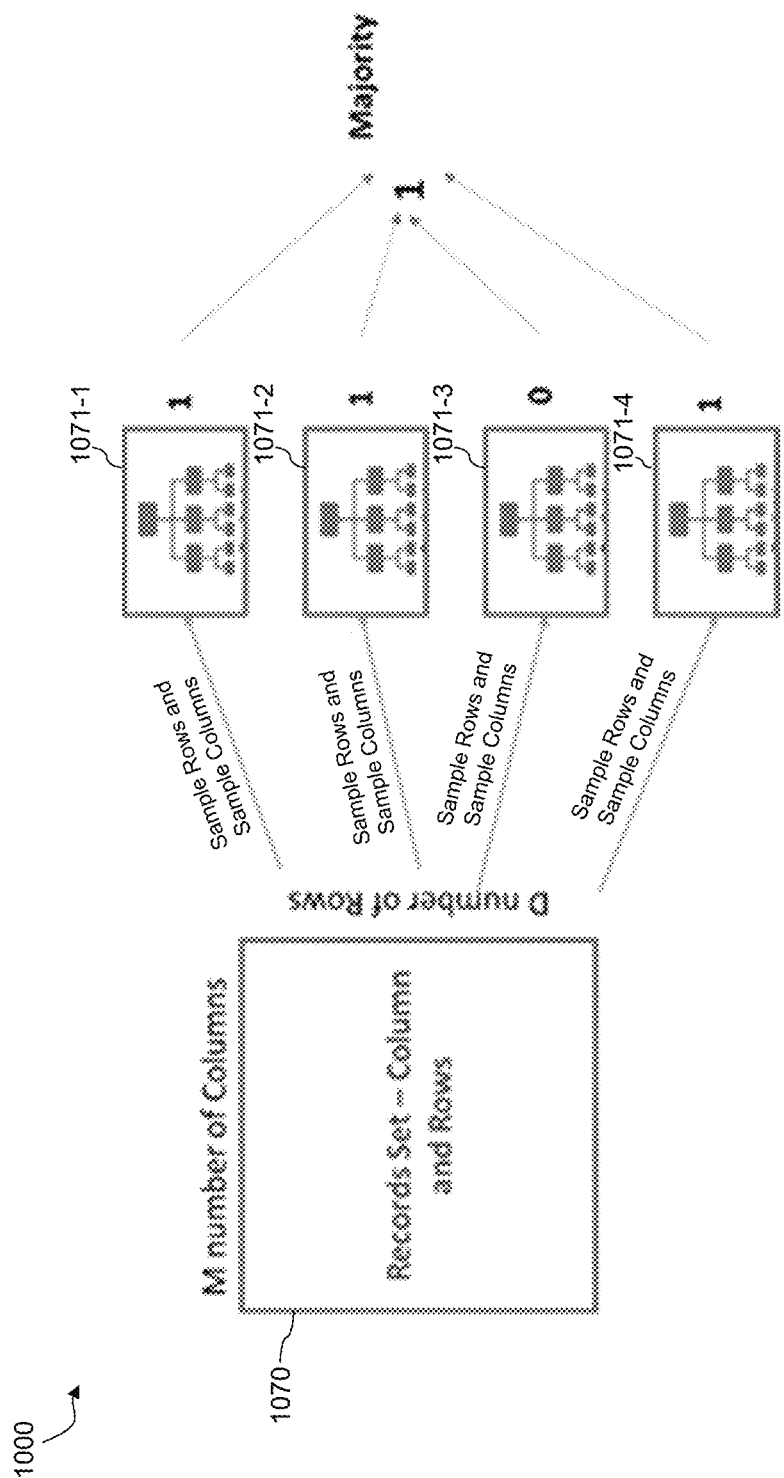
FIG. 10 is a block diagram illustrating application of a random forest algorithm in an illustrative embodiment.

Referring to the block diagram 1000 illustrating application of a random forest algorithm in FIG. 10, the random forest algorithm uses a large number of individual decision trees (e.g., decision trees 1071-1, 1071-2, 1071-3 and 1071-4 that operate as an ensemble. Each tree in the random forest outputs a class prediction (0 or 1), and the class with the most votes (e.g., majority) becomes the model's prediction. The model combines several decision trees to produce increased predictive performance than when utilizing a single decision tree. The final attribute prediction is calculated by computing the average/mean value of the individual predictions from respective ones of the group of decision trees 1071.

The ensemble methods comprise learning algorithms that construct a set of classifiers and classify new data points by taking a weighted vote of the predictions of each classifier. Several base models are combined in order to produce one optimal predictive model. The main principle behind the ensemble model is that a group of weak learners come together to form a strong learner.

According to the embodiments, bootstrap aggregating, also called bagging, is performed. The bootstrap aggregating techniques use a machine learning ensemble meta-algorithm designed to improve the stability and accuracy of machine learning algorithms used in statistical classification and regression, reduce variance and further the avoidance of overfitting.

Random forest is an extension over bagging. The random forest regressor algorithm used by the machine learning model includes an ensemble technique which uses a configurable set of homogenous models (e.g., decision trees) to combine the predictions of each model and generate a final prediction. In addition to taking a random subset of data, the random forest regressor algorithm also takes a random selection of features (e.g., sample rows and sample columns) to grow decision trees rather than using all features from the records set 1070.

A decision tree by itself has low bias and high variance. In other words, the decision tree may completely fit the training data (e.g., low bias), but with new test points, the error increases (e.g., high variance). When multiple decision trees are coupled with row and column sampling (e.g., in the case of a random forest algorithm), the combined variance offered by the collection of decision trees is low. As a result, the random forest model exhibits low bias and low variance.

Referring back to FIGS. 1-3, the database recommendation layer 144 recommends at least one of the destination databases 105 for data from one or more data sources 103 based at least in part on the one or more file formats and/or data types of one or more input files (e.g., files 261, 361, 461). Referring to block 263 in FIG. 2, as described herein above, the data modeling engine 140/340 determines a data model for the destination database and identifies database keys for the destination database. At block 264, the data modeling engine 140/340 generates a schema(s), table(s) and/or an index(es) for the destination database.

Referring to block 355 of FIG. 3 and to the execution phase 270 of FIG. 2, once one or more destination databases 105 have been determined, the data loading engine 150/350 dynamically loads the data of the data sources 103 to the one or more destination databases 105. For example, referring to FIG. 3, the destination databases can comprise a document database 305-1, a columnar database 305-2, a relational database 305-3 and/or an MPP database 305-4 (collectively "destination databases 305").

According to illustrative embodiments, the data loading engine 150/350 generates one or more dynamic scripts for loading the data of one or more files (e.g., files 261, 361, 461) to at least one destination database 105/305. In more detail, the data loading engine 150/350 generates a plurality of containers to receive the data of the one or more files and to load the data of the one or more files to the at least one destination database 105/305. One or more of the plurality of containers are selected to load the data of the one or more files to the at least one destination database 105/305 based on one or more factors such as, for example, the generated data model, the at least one destination database 105/305 and available resources.

In FIG. 3, a plurality of pluggable data connectors 307-1, 307-2, 307-3 and 307-4 (collectively "data connectors 307") operate as interfaces to document database 305-1, columnar database 305-2, relational database 305-3 and MPP database 305-4. The data connectors 307 interface between the destination databases 305, and components of the data and database management platform 310 that identify the database data types and indexes and predict the keys, partitions, node attributes and indexes based on the destination database types. In one or more embodiments, the data connectors 307 comprise APIs configured to connect with specific databases and push and pull data and metadata from the destination databases 305.

Referring back to FIG. 2, in the operational flow 200, a user via a user device 202 can read data from and write data to the various destination databases 305. The user, via the user device 202, which can be the same or similar to one of the user devices 102, transmits files (e.g., file 261) to the data and database management platform 110 to be analyzed in a definition phase 260 for a determination of one or more databases to which the file data should be loaded, and the generation of data models for writing the file data to the one or more databases. Additionally or in the alternative, files can be pulled from the user devices 102/202 without user input.

During an execution phase 270, at block 271, a file (e.g., file 261) is uploaded to the data and database management platform 110. At block 272, the rules defining or outlining parameters for defining file formats and/or data types of incoming files are validated. If the validation fails, a user is notified via the user device 202 and process for loading the data to the at least one destination database 105/305 fails. If the validation is successful, the operational flow 200 proceeds to block 273, where the file data is dynamically loaded to the at least one destination database 105/305 in accordance with the data model generated by the data modeling engine 140/340.

Figure 11:
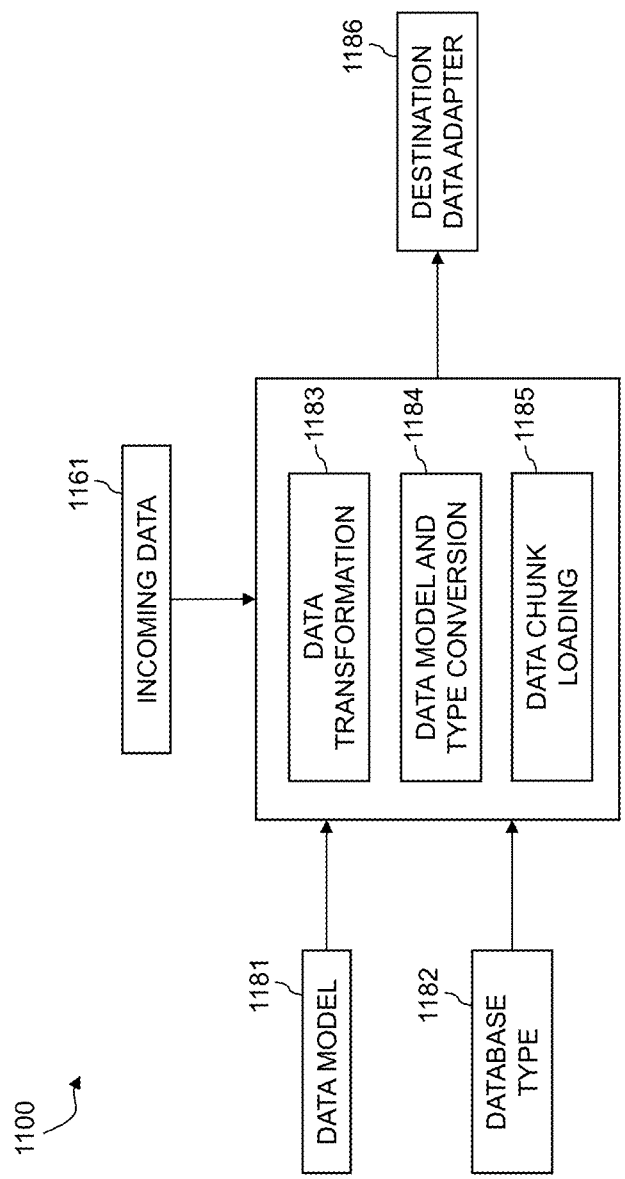
FIG. 11 illustrates an architecture for dynamic data loading in an illustrative embodiment.

FIG. 11 illustrates an architecture 1100 for dynamic data loading. Based on the identified data model 1181 (e.g., identified by the data modeling engine 140/340) and a recommended destination database type 1182 based on the format and data type of the incoming data 1161, the data loading engine 150/350 performs data transformation 1183, data model and type conversion 1184 and data chunk loading 1185. The data loading engine 150/350 interfaces with a destination data adapter 1186 (e.g., one of the data connectors 307) to load the processed data to one or more destination databases 105/305/405.

The data loading engine 150/350 classifies file formats of incoming data 1161 and generates a mapping between those formats and the destination database type 1182 and data model 1181. With conventional techniques, data loading scripts are written for single data sources each time data needs to be loaded, resulting in a large data pipeline. It is extremely difficult to classify or divide the data pipeline into manageable chunks. The illustrative embodiments advantageously provide a method of loading data that is both dynamic and scalable. The data transformation 1183, data model and type conversion 1184 and data chunk loading 1185 are well-suited for multiple different types of databases. FIG. 12 illustrates example pseudocode 1200 for dynamic data loading.

Figure 13:
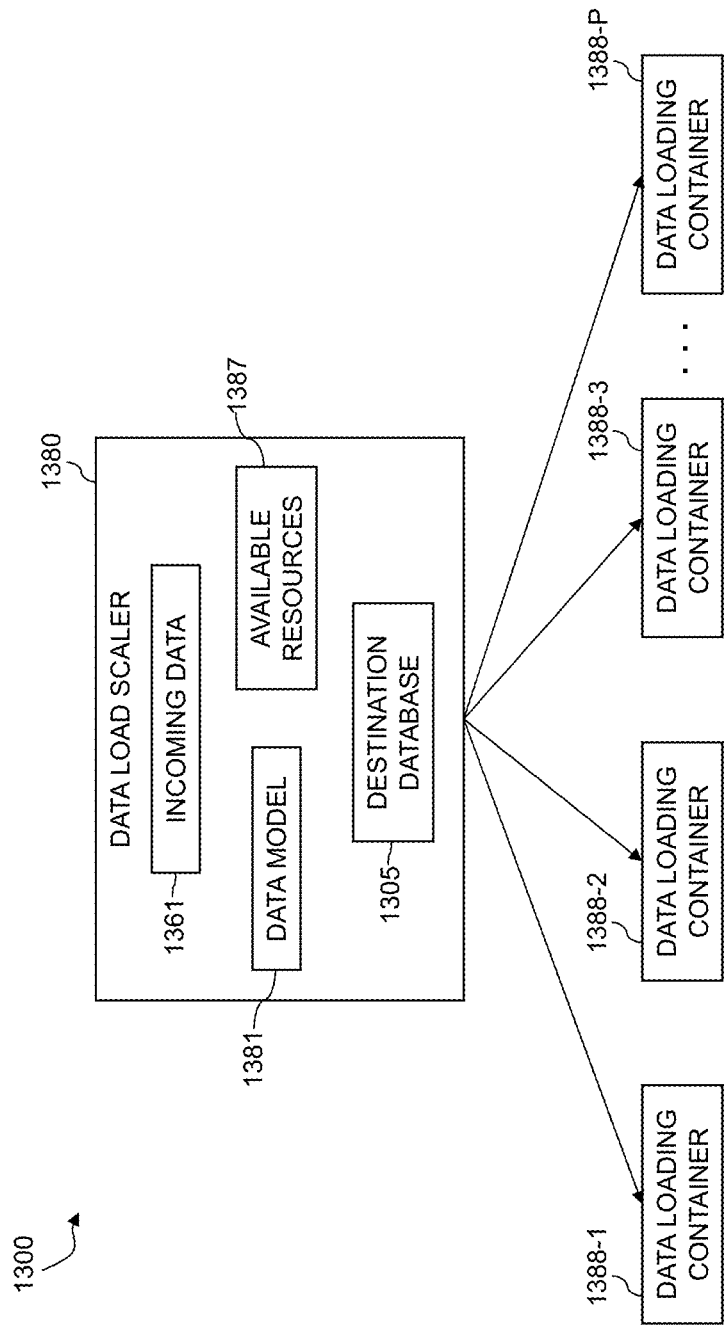
FIG. 13 depicts an operational flow for selection of a container for loading data in an illustrative embodiment.

FIG. 13 depicts an operational flow 1300 for selection of a container for loading data. A data load scaler 1380 orchestrates the selection of one of the containers 1388-1, 1388-2, 1388-3, . . . , 1388-P (collectively "containers 1388") to perform the operations needed to load incoming data 1361 to a destination database 1305. The containers may comprise, for example, Linux containers (LXCs) or other similar virtual resource. Each of the containers is configured in the same or a similar manner to perform the data transformation 1183, data model and type conversion 1184 and data chunk loading 1185 as described in connection with FIG. 11. The data load scaler 1380 rotates the containers 1388 used for data loading based on, for example, the incoming data 1361, data model 1381, the destination database 1305 and/or available compute resources 1387 (e.g., available devices with least load at a given time to perform the data loading) in order to scale the data loading. The data load scaler 1380 chooses at least one of the containers 1388 in which to load the data and populate the designated destination database 1305 with the incoming data 1361.

Figure 14A:
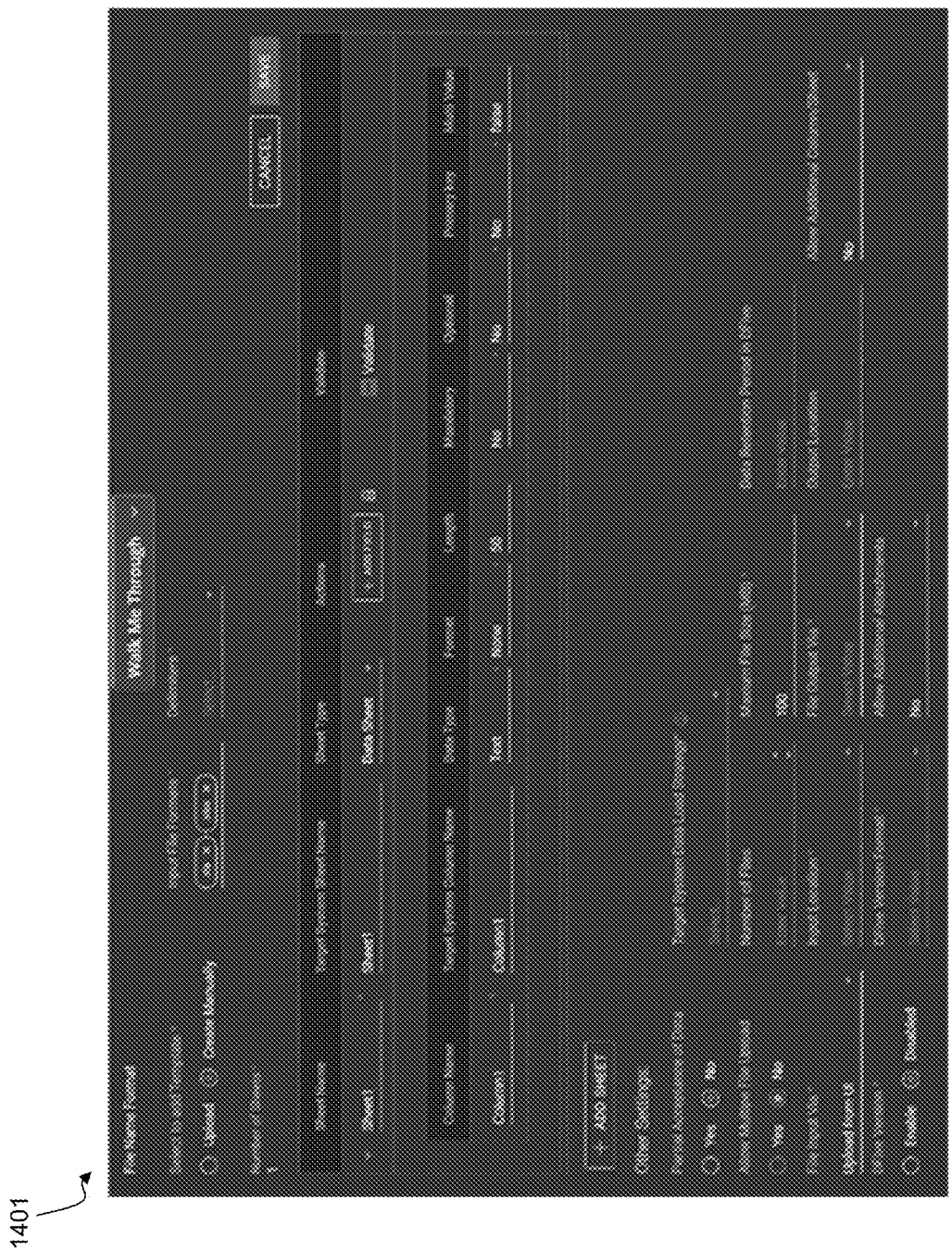
FIG. 14A depicts an example user interface for defining settings in connection with capturing and controlling data in an illustrative embodiment.

FIG. 14A depicts an example user interface 1401 for defining settings in connection with capturing and controlling data. The template provided in the user interface 1401 gives a user the ability to define settings to facilitate capturing of multiple data types with multiple data attributes. Some settings include, for example, partial accept, multiple files, upload via user interface (UI), load strategy (e.g., number of files), potential target name, etc.

Figure 14B:
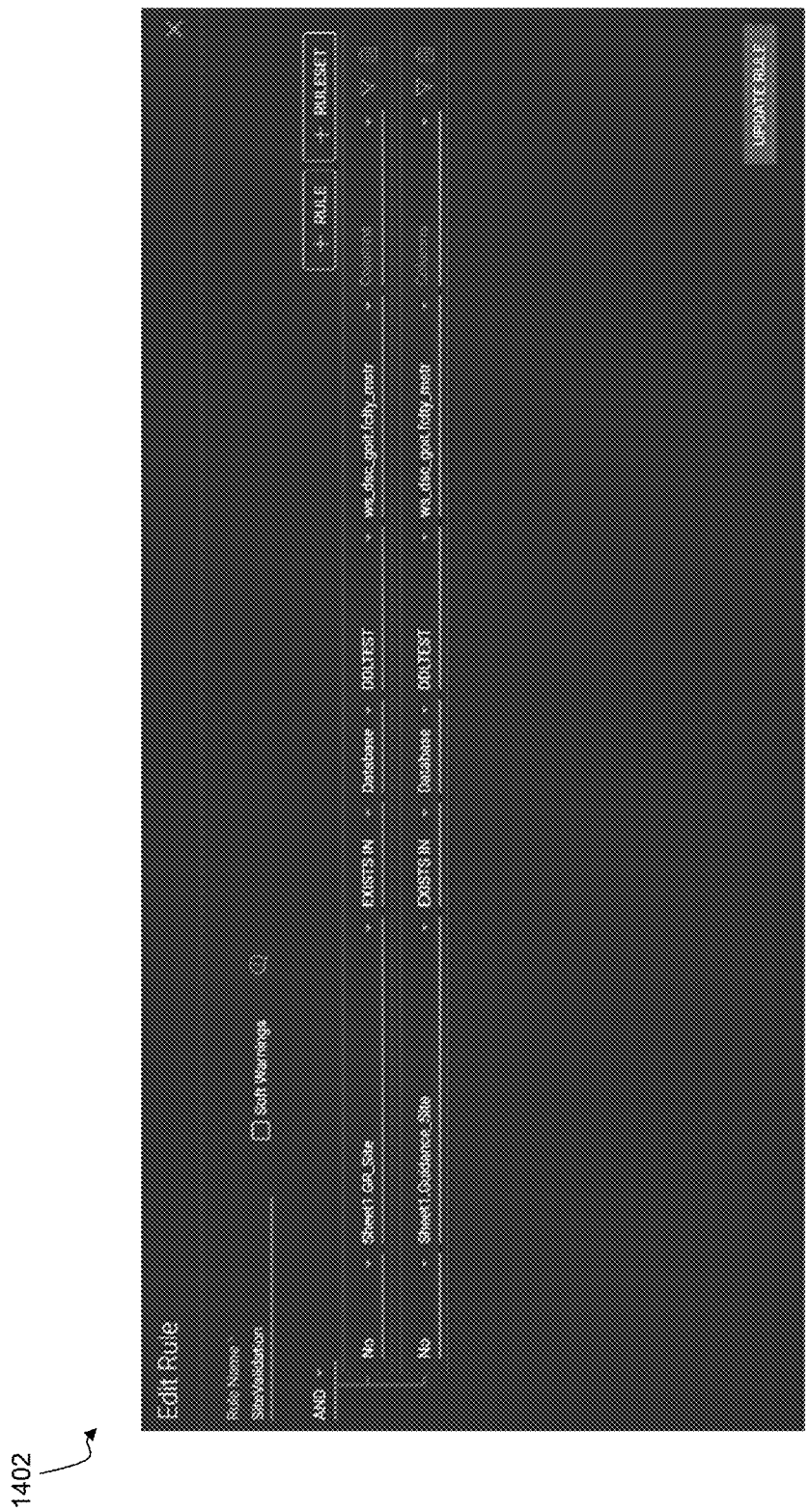
FIG. 14B depicts an example user interface for adding and/or defining a rule in an illustrative embodiment.

FIG. 14B depicts an example user interface 1402 for adding and/or defining a rule (see, e.g., block 265 of FIG. 2). The template provided in the user interface 1402 gives a user the ability to add or modify rules without using code.

Figure 14C:
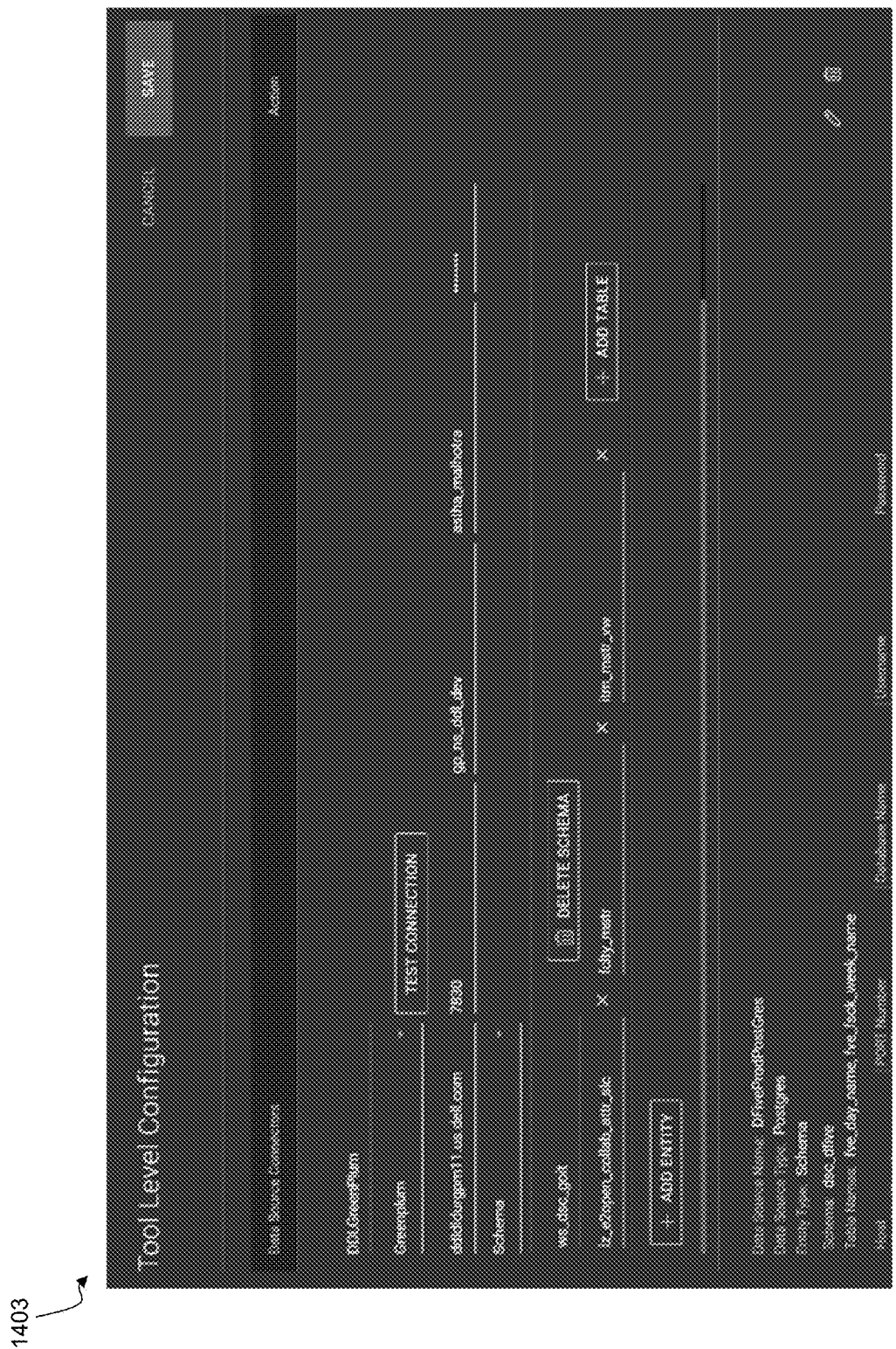
FIG. 14C depicts an example user interface for defining settings in connection with a destination database in an illustrative embodiment.

FIG. 14C depicts an example user interface 1403 for defining settings in connection with a destination database. The template provided in the user interface 1403 gives a user the ability to configure settings in connection with a destination database so that the right adapter can be used.

According to one or more embodiments, the databases referred to herein are implemented using one or more storage systems or devices, which can be associated with the data and database management platform 110. In some embodiments, one or more of the storage systems utilized to implement the databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the data and database management platform 110, the data collection and mapping engine 120, file format and data type engine 130, data modeling engine 140 and/or data loading engine 150 in other embodiments can be implemented at least in part externally to the data and database management platform 110, for example, as stand-alone servers, sets of servers or other types of systems coupled to the network 104. For example, the data collection and mapping engine 120, file format and data type engine 130, data modeling engine 140 and/or data loading engine 150 may be provided as cloud services accessible by the data and database management platform 110.

The data collection and mapping engine 120, file format and data type engine 130, data modeling engine 140 and/or data loading engine 150 in the FIG. 1 embodiment are each assumed to be implemented using at least one processing device. Each such processing device generally comprises at least one processor and an associated memory, and implements one or more functional modules for controlling certain features of the data collection and mapping engine 120, file format and data type engine 130, data modeling engine 140 and/or data loading engine 150.

At least portions of the data and database management platform 110 and the elements thereof may be implemented at least in part in the form of software that is stored in memory and executed by a processor. The data and database management platform 110 and the elements thereof comprise further hardware and software required for running the data and database management platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data collection and mapping engine 120, file format and data type engine 130, data modeling engine 140, data loading engine 150 and other elements of the data and database management platform 110 in the present embodiment are shown as part of the data and database management platform 110, at least a portion of the data collection and mapping engine 120, file format and data type engine 130, data modeling engine 140, data loading engine 150 and other elements of the data and database management platform 110 in other embodiments may be implemented on one or more other processing platforms that are accessible to the data and database management platform 110 over one or more networks. Such elements can each be implemented at least in part within another system element or at least in part utilizing one or more stand-alone elements coupled to the network 104.

It is assumed that the data and database management platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or LXCs, or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data collection and mapping engine 120, file format and data type engine 130, data modeling engine 140, data loading engine 150 and other elements of the data and database management platform 110, and the elements thereof can each be implemented in the form of one or more LXCs running on one or more VMs. Other arrangements of one or more processing devices of a processing platform can be used to implement the data collection and mapping engine 120, file format and data type engine 130, data modeling engine 140 and data loading engine 150, as well as other elements of the data and database management platform 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the data and database management platform 110 to reside in different data centers. Numerous other distributed implementations of the data and database management platform 110 are possible.

Accordingly, one or each of the data collection and mapping engine 120, file format and data type engine 130, data modeling engine 140, data loading engine 150 and other elements of the data and database management platform 110 can each be implemented in a distributed manner so as to comprise a plurality of distributed elements implemented on respective ones of a plurality of compute nodes of the data and database management platform 110.

It is to be appreciated that these and other features of illustrative embodiments are presented by way of example only, and should not be construed as limiting in any way. Accordingly, different numbers, types and arrangements of system elements such as the data collection and mapping engine 120, file format and data type engine 130, data modeling engine 140, data loading engine 150 and other elements of the data and database management platform 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the data and database management platform can be offered to cloud infrastructure customers or other users as part of FaaS, CaaS and/or PaaS offerings.

Figure 15:
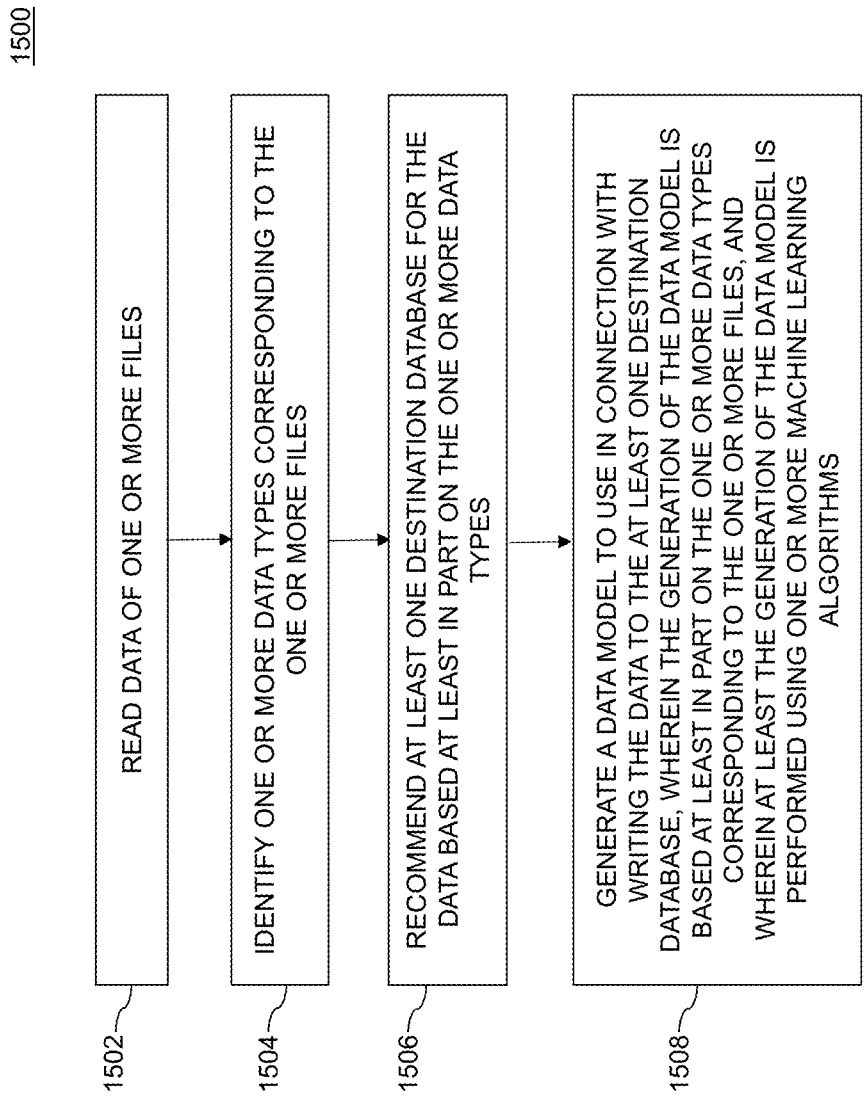
FIG. 15 depicts a process for managing data for loading into destination databases according to an illustrative embodiment.

The operation of the information processing system 100 will now be described in further detail with reference to the flow diagram of FIG. 15. With reference to FIG. 15, a process 1500 for managing data for loading into destination databases as shown includes steps 1502 through 1508, and is suitable for use in the system 100 but is more generally applicable to other types of information processing systems comprising a data and database management platform configured for managing data for loading into destination databases.

In steps 1502 and 1504, data of one or more files is read, and one or more data types corresponding to the one or more files are identified. In step 1506, at least one destination database for the data is recommended based at least in part on the one or more data types, and in step 1508, a data model to use in connection with writing the data to the at least one destination database is generated. The generation of the data model is based at least in part on the one or more data types corresponding to the one or more files. At least the generation of the data model is performed using one or more machine learning algorithms.

In illustrative embodiments, generating the data model comprises mapping the one or more data types corresponding to the one or more files to one or more data types corresponding to the at least one destination database. Metadata for the one or more data types corresponding to the one or more files and for the one or more data types corresponding to the at least one destination database is collected. One or more data type names are identified from the metadata. The mapping is based at least in part on the one or more data type names.

One or more data types corresponding to the at least one destination database are identified, wherein identifying the one or more data types corresponding to the one or more files and/or to the at least one destination database comprises executing a pattern matching algorithm.

Generating the data model further comprises predicting one or more destination database keys. The one or more destination database keys comprise, for example, a primary key, a distribution key, a partition key and/or a surrogate key.

Generating the data model also comprises identifying one or more attributes to select as nodes of the at least one destination database, wherein the identifying is performed using the one or more machine learning algorithms, and the one or more machine learning algorithms comprise a decision tree algorithm such as, for example, a random forest algorithm. The one or more machine learning algorithms: (i) compute entropy for respective ones of the one or more attributes following a split of the respective ones of the one or more attributes; and (ii) compute information gain for respective ones of the one or more attributes. The one or more attributes with the highest information gain are selected as the nodes of the at least one destination database.

In an illustrative embodiment, writing the data to the at least one destination database comprises generating one or more dynamic scripts for loading the data of the one or more files to the at least one destination database. Writing the data to the at least one destination database may also comprise generating a plurality of containers to receive the data of the one or more files and to load the data of the one or more files to the at least one destination database. One or more of the plurality of containers to load the data of the one or more files to the at least one destination database are selected based on one or more factors. The one or more factors include, but are not necessarily limited to, the data model, the at least one destination database and available resources.

In illustrative embodiments, one or more formats corresponding to the one or more files are identified, wherein the recommendation of the at least one destination database is further based at least in part on the one or more formats.

It is to be appreciated that the FIG. 15 process and other features and functionality described above can be adapted for use with other types of information systems configured to execute data movement services in a data and database management platform or other type of platform.

The particular processing operations and other system functionality described in conjunction with the flow diagram of FIG. 15 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 15 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a data and database management platform as disclosed herein can provide a number of significant advantages relative to conventional arrangements. For example, the data and database management platform provides an intelligent (smart) database gateway for multiple types of databases. The data and database management platform is configured to automatically replicate data, identify data formats of destination databases, and, in generating a destination database model, automatically define data schemas and predict and apply required indexes, distribution keys and partitions. The embodiments advantageously provide a framework for automatic data replication processes, discovering destination databases, dynamically modeling data and identifying data patterns for data replication.

The embodiments leverage the strengths of existing databases, and seamlessly integrate differently configured databases by using machine learning techniques to generate destination database models. As an additional advantage, the embodiments use machine learning techniques to provide a sophisticated linear-time algorithm for two-dimensional pattern matching that can be used to generate data models for different types of destination databases. The embodiments use a combination of decision tree and random forest methods to classify the data and find the right database key indexes based on the type of database to which the data is being sent.

Under current approaches, in order to validate and load data from files to differently configured databases, techniques for doing so are created on an on-demand basis, requiring manual data analysis to gain an understanding of the data and troubleshooting to develop a data model before moving data to differently configured databases. The tools that are currently in use require a software development life cycle (SDLC) process in order to extract, validate and load data into an appropriate database. These efforts represent considerable time spent on requirements collecting, sprint planning, development, testing and production releases. Unlike the current approaches, the embodiments advantageously use metadata from incoming files and destination databases to map data source file formats and data types to destination database formats and data types, and apply one or more machine learning techniques to generate a destination database model in real-time based on the analysis. The embodiments save computing resources and improve data and database management by efficiently and automatically determining accurate destination database models on which to base the replication of data from data sources in destination databases.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the data and database management platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a data and database management platform in illustrative embodiments. These and other cloud-based systems in illustrative embodiments can include object stores.

Illustrative embodiments of processing platforms will now be described in greater detail with reference to FIGS. 16 and 17. Although described in the context of system 100, these platforms may also be used to implement at least portions of other information processing systems in other embodiments.

Figure 16:
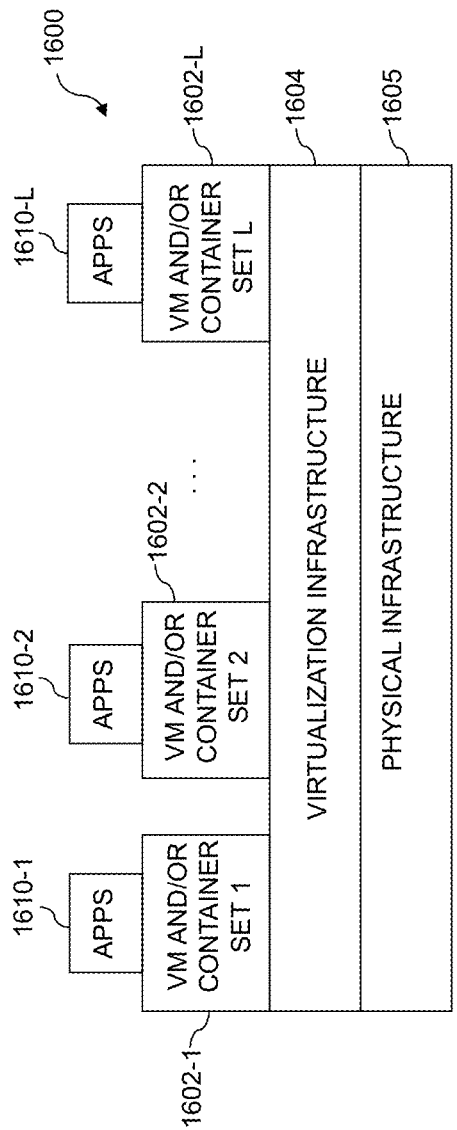
FIGS. 16 and 17 show examples of processing platforms that may be utilized to implement at least a portion of an information processing system according to illustrative embodiments.
Figure 17:
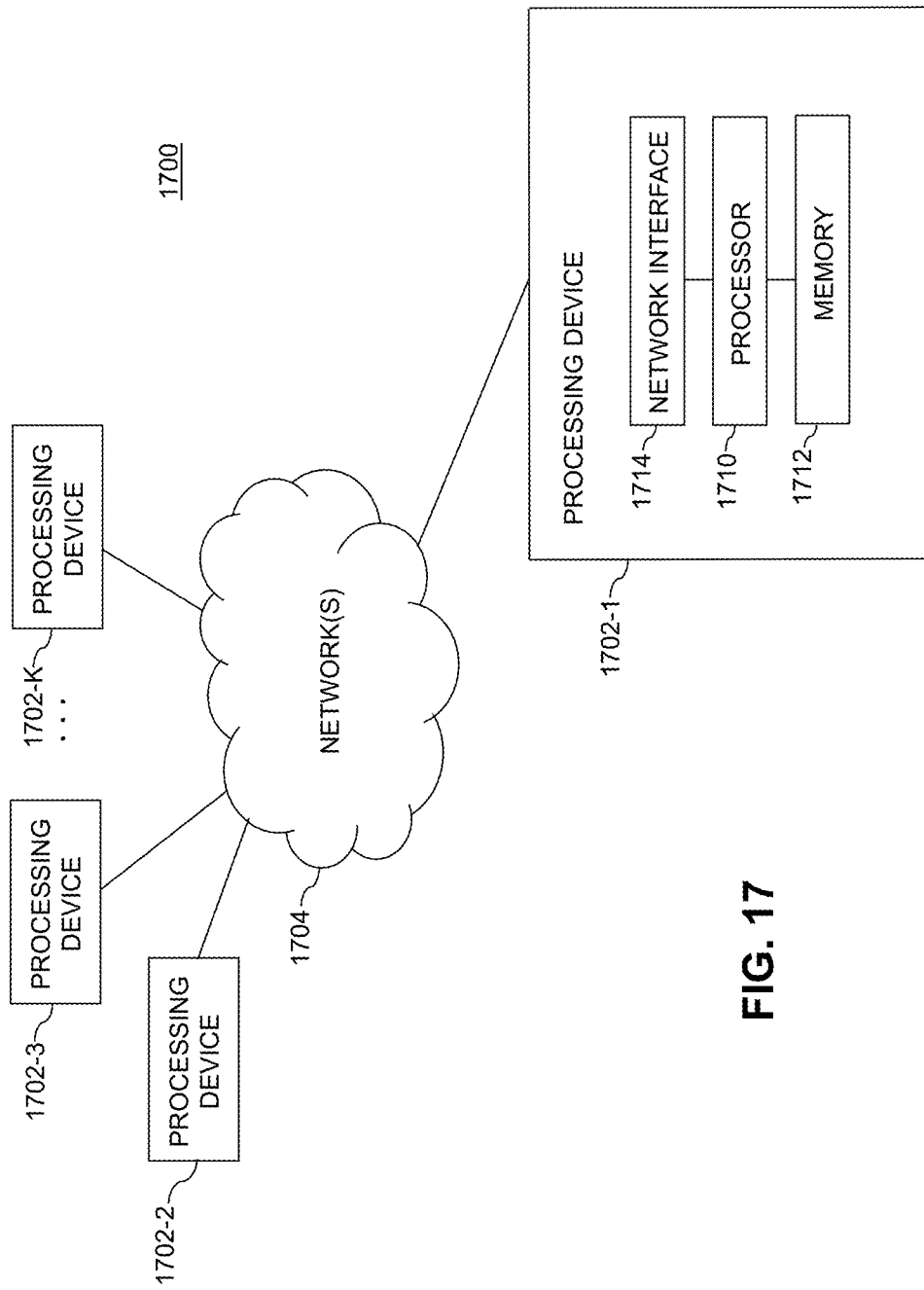

FIG. 16 shows an example processing platform comprising cloud infrastructure 1600. The cloud infrastructure 1600 comprises a combination of physical and virtual processing resources that may be utilized to implement at least a portion of the information processing system 100. The cloud infrastructure 1600 comprises multiple virtual machines (VMs) and/or container sets 1602-1, 1602-2, . . . 1602-L implemented using virtualization infrastructure 1604. The virtualization infrastructure 1604 runs on physical infrastructure 1605, and illustratively comprises one or more hypervisors and/or operating system level virtualization infrastructure. The operating system level virtualization infrastructure illustratively comprises kernel control groups of a Linux operating system or other type of operating system.

The cloud infrastructure 1600 further comprises sets of applications 1610-1, 1610-2, . . . 1610-L running on respective ones of the VMs/container sets 1602-1, 1602-2, . . . 1602-L under the control of the virtualization infrastructure 1604. The VMs/container sets 1602 may comprise respective VMs, respective sets of one or more containers, or respective sets of one or more containers running in VMs.

In some implementations of the FIG. 16 embodiment, the VMs/container sets 1602 comprise respective VMs implemented using virtualization infrastructure 1604 that comprises at least one hypervisor. A hypervisor platform may be used to implement a hypervisor within the virtualization infrastructure 1604, where the hypervisor platform has an associated virtual infrastructure management system. The underlying physical machines may comprise one or more distributed processing platforms that include one or more storage systems.

In other implementations of the FIG. 16 embodiment, the VMs/container sets 1602 comprise respective containers implemented using virtualization infrastructure 1604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1600 shown in FIG. 16 may represent at least a portion of one processing platform. Another example of such a processing platform is processing platform 1700 shown in FIG. 17.

The processing platform 1700 in this embodiment comprises a portion of system 100 and includes a plurality of processing devices, denoted 1702-1, 1702-2, 1702-3, . . . 1702-K, which communicate with one another over a network 1704.

The network 1704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1702-1 in the processing platform 1700 comprises a processor 1710 coupled to a memory 1712. The processor 1710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1712 may comprise random access memory (RAM), read-only memory (ROM), flash memory or other types of memory, in any combination. The memory 1712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1702-1 is network interface circuitry 1714, which is used to interface the processing device with the network 1704 and other system components, and may comprise conventional transceivers.

The other processing devices 1702 of the processing platform 1700 are assumed to be configured in a manner similar to that shown for processing device 1702-1 in the figure.

Again, the particular processing platform 1700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the data and database management platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and data and database management platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
reading data of one or more files;
identifying one or more data types corresponding to the one or more files;
recommending at least one destination database for the data based at least in part on the one or more data types; and
generating a data model to use in connection with writing the data to the at least one destination database;
wherein the generation of the data model is based at least in part on the one or more data types corresponding to the one or more files;
wherein at least the generation of the data model is performed using one or more machine learning algorithms;
wherein generating the data model comprises using the one or more machine learning algorithms to:
identify a plurality of attributes to select as candidates for at least one node of the at least one destination database;
compute information gain for respective ones of the one or more attributes, wherein at least one attribute with a highest information gain than remaining ones of the plurality of attributes is selected as the at least one node of the at least one destination database; and
predict one or more partitions for the destination database, the one or more partitions respectively storing portions of the data; and
wherein the method is executed by a processing device operatively coupled to a memory.

2. The method of claim 1 wherein generating the data model further comprises mapping the one or more data types corresponding to the one or more files to one or more data types corresponding to the at least one destination database.

3. The method of claim 2 further comprising:
collecting metadata for the one or more data types corresponding to the one or more files and for the one or more data types corresponding to the at least one destination database; and
identifying one or more data type names from the metadata;
wherein the mapping is based at least in part on the one or more data type names.

4. The method of claim 1 further comprising identifying one or more data types corresponding to the at least one destination database, wherein identifying the one or more data types corresponding to at least one of the one or more files and to the at least one destination database comprises executing a pattern matching algorithm.

5. The method of claim 1 wherein generating the data model further comprises predicting one or more destination database keys.

6. The method of claim 5 wherein the one or more destination database keys comprise at least one of a primary key, a distribution key, a partition key and a surrogate key.

7. The method of claim 1 wherein the one or more machine learning algorithms comprise a decision tree algorithm.

8. The method of claim 7 wherein the one or more machine learning algorithms further comprise a random forest algorithm.

9. The method of claim 1 wherein the one or more machine learning algorithms compute entropy for respective ones of the one or more attributes following a split of the respective ones of the one or more attributes.

10. The method of claim 1 wherein writing the data to the at least one destination database comprises generating one or more dynamic scripts for loading the data of the one or more files to the at least one destination database.

11. The method of claim 1 wherein writing the data to the at least one destination database comprises generating a plurality of containers to receive the data of the one or more files and to load the data of the one or more files to the at least one destination database.

12. The method of claim 11 further comprising selecting one or more of the plurality of containers to load the data of the one or more files to the at least one destination database based on one or more factors.

13. The method of claim 12 wherein the one or more factors comprise at least one of the data model, the at least one destination database and available resources.

14. The method of claim 1 further comprising identifying one or more formats corresponding to the one or more files, wherein the recommendation of the at least one destination database is further based at least in part on the one or more formats.

15. An apparatus comprising:
a processing device operatively coupled to a memory and configured to:
read data of one or more files;
identify one or more data types corresponding to the one or more files;
recommend at least one destination database for the data based at least in part on the one or more data types; and
generate a data model to use in connection with writing the data to the at least one destination database;
wherein the generation of the data model is based at least in part on the one or more data types corresponding to the one or more files;
wherein at least the generation of the data model is performed using one or more machine learning algorithms; and
wherein generating the data model comprises using the one or more machine learning algorithms to:

identify a plurality of attributes to select as candidates for at least one node of the at least one destination database;

compute information gain for respective ones of the one or more attributes, wherein at least one attribute with a highest information gain than remaining ones of the plurality of attributes is selected as the at least one node of the at least one destination database; and predict one or more partitions for the destination database, the one or more partitions respectively storing portions of the data.

16. The apparatus of claim 15 wherein, in writing the data to the at least one destination database, the processing device is configured to generate one or more dynamic scripts for loading the data of the one or more files to the at least one destination database.

17. The apparatus of claim 15 wherein, in writing the data to the at least one destination database, the processing device is configured to generate a plurality of containers to receive the data of the one or more files and to load the data of the one or more files to the at least one destination database.

18. An article of manufacture comprising a non-transitory processor-readable storage medium having stored therein program code of one or more software programs, wherein the program code when executed by at least one processing device causes said at least one processing device to perform steps of:

reading data of one or more files;

identifying one or more data types corresponding to the one or more files;

recommending at least one destination database for the data based at least in part on the one or more data types; and generating a data model to use in connection with writing the data to the at least one destination database;

wherein the generation of the data model is based at least in part on the one or more data types corresponding to the one or more files;

wherein at least the generation of the data model is performed using one or more machine learning algorithms; and wherein generating the data model comprises using the one or more machine learning algorithms to:

identify a plurality of attributes to select as candidates for at least one node of the at least one destination database;

compute information gain for respective ones of the one or more attributes, wherein at least one attribute with a highest information gain than remaining ones of the plurality of attributes is selected as the at least one node of the at least one destination database; and predict one or more partitions for the destination database, the one or more partitions respectively storing portions of the data.

19. The article of manufacture of claim 18 wherein, in writing the data to the at least one destination database, the program code causes said at least one processing device to generate a plurality of containers to receive the data of the one or more files and to load the data of the one or more files to the at least one destination database.

20. The article of manufacture of claim 18 wherein, in writing the data to the at least one destination database, the program code causes said at least one processing device to generate one or more dynamic scripts for loading the data of the one or more files to the at least one destination database.

* * * * *